Feb. 2, 1943.   J. J. GOUGH   2,309,641
ELECTRIC APPLIANCE
Original Filed June 3, 1940
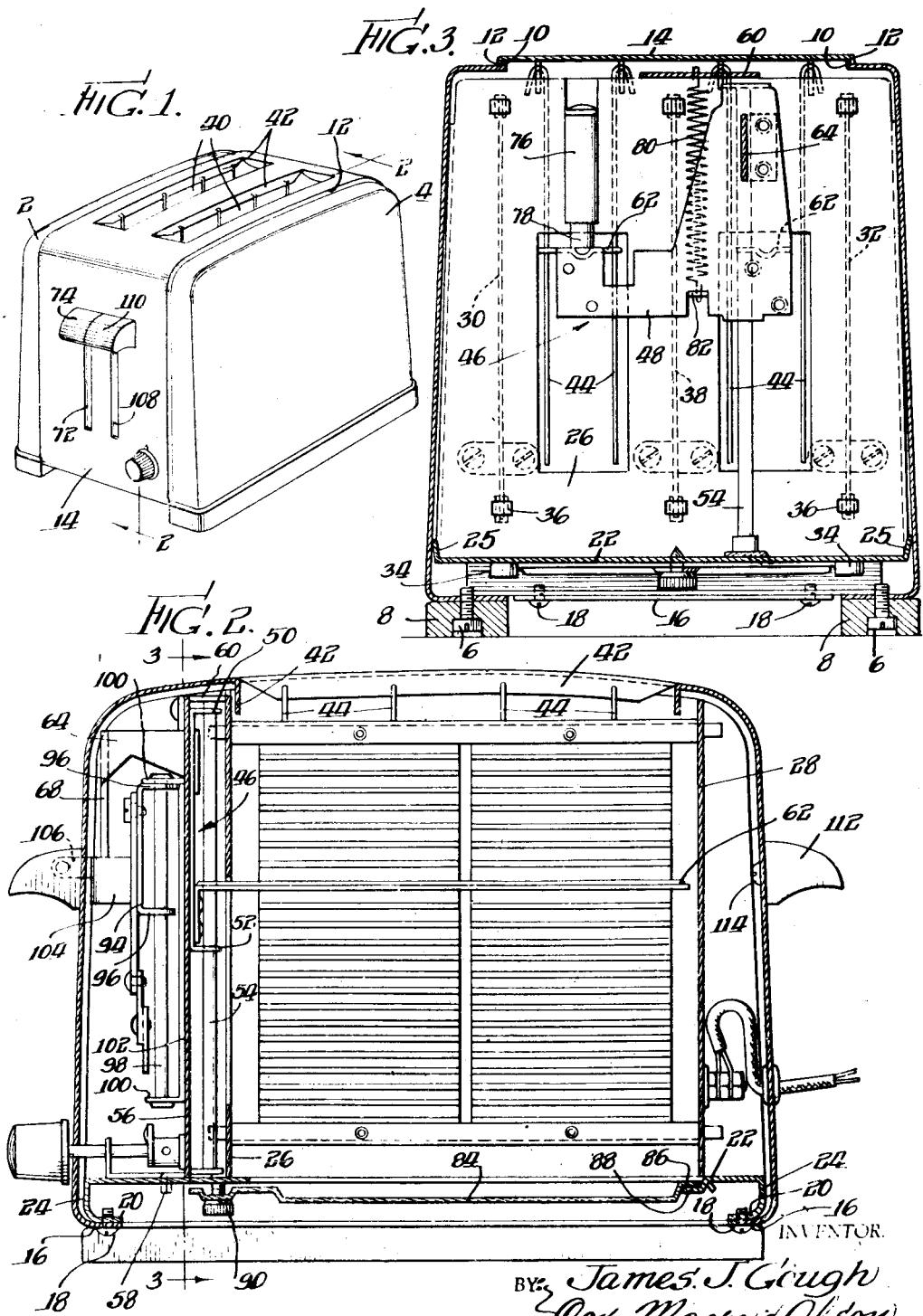
INVENTOR.
BY James J. Gough
Cox Moore & Olson
ATTYS Patented Feb. 2, 1943

2,309,641

UNITED STATES PATENT OFFICE 2,309,641

ELECTRIC APPLIANCE

James J. Gough, Chicago, Ill., assignor to Chicago Electric Manufacturing Company, Chicago, Ill., a corporation of Illinois Original application June 3, 1940, Serial No. 338,449. Divided and this application December 30, 1940, Serial No. 372,281

7 Claims. (Cl. 53—5)

This invention relates to electric toasters and has more particular reference to electric toasters of the type having a bread receiving tray or trays vertically shiftable to carry the bread between the toasting elements.

This application is a division of my copending application, Serial No. 338,449, filed June 3, 1940, for an improvement in an Electric toaster.

An object of the invention is to improve the construction and decrease the manufacturing cost of toasters of this type.

A further object of the applicant's invention is to provide in a toaster of this type a casing construction formed of sheet metal stampings which may be readily assembled and interlocked at a minimum manufacturing expense.

A still further object of the invention is to provide a casing construction for a toaster of this type wherein means is provided for creating an updraft of air through the toasting chamber or chambers for insuring uniform toasting of each article and for minimizing the differences in the degree of toasting of successively toasted articles.

The applicant's invention also contemplates the provision of readily releasable crumb receiving means underlying the tray or forming the the bottom wall of the toaster chamber or chambers and being spaced when in operative position from its mounting wall so as to provide ventilating openings insuring maintenance of the tray in a relatively cool condition and facilitating an updraft of air through the toasting chamber.

Other and further objects and advantages will be apparent from the following description when taken in connection with the accompanying drawing, wherein Figure 1 is a perspective view of a toaster embodying the invention;

Figure 2 is an enlarged vertical section taken along the line 2—2 of Figure 1; and Figure 3 is a vertical section taken along the line 2—2 of Figure 2.

As shown in the drawing, the embodiment selected to illustrate the invention comprises a pair of pan-shaped, sheet metal stampings forming opposed side members 2 and 4. These side members are fastened in any convenient manner as by screws 6 passing through the bottom flanges of the members and received in spaced mounting bars 8 of any suitable heat insulating material whereby the toaster casing is spaced vertically from the surface or table on which it is used. The relatively large space thus provided between these mounting bars 8 permits a substantial circulation of air beneath the casing, to thus prevent overheating of the surface or table upon which the toaster is used.

The upper inturned flange or edge of each of the side members is formed to provide an upstanding flange or bead 10 interlocking with the downturned peripheral flanges 12 of a central substantially U-shaped sheet metal stamping or casing member 14. The interlocking of the flanges 10 and 12 secures the casing members 2, 4 and 14 against outward lateral displacement.

At its lower ends, the central casing member 14 is turned inwardly to provide flanges 16 fastened as by screws 18 to the inturned flanges 20 of a sheet metal plate 22 forming the bottom for the toasting or heating chamber. The bottom plate 22 is preferably formed with opposed, downturned vertical end flanges 24 integrally connecting the upper plate portion with the inturned flanges 20 and upturned side flanges 25 so as to reinforce the bottom plate and to engage and hold the casing members 2, 4 and 14 against inward displacement.

The toasting or heating chamber is formed by the plate 22 in cooperation with the end plates 26 and 28 and the outer sheet-like heating elements 30 and 32 which form the side walls of the heating chamber. The end plates 26 and 28 may be secured to bottom plate 22 in any convenient manner as for example by depending lugs 34 extending through openings in the bottom plate and twisted for retention therein. The heating elements 30 and 32 may be of conventional structure and preferably of sheet-like formation secured between hanger bars or clips 36 having reduced ends received in suitable apertures in the end plates 26 and 28. The heating chamber is preferably subdivided by a sheet-like heating element 38 disposed centrally of the chamber and mounted on the end plates 26 and 28 in a manner similar to the outer heating elements 30 and 32.

The top of the toaster as formed by the central casing member 14 is provided with openings 40 into the toast chamber or chambers. The edges of the openings 40 are defined by depending flanges 42, the longitudinally extending ones of which provide mounting means for the usual guard wires 44 which extend over the heating elements and prevent the toast from engaging such elements. At their lower ends the guard wires 44 may be secured to any suitable transverse mounting strip not shown.

A toaster carriage or tray 46 comprises a sheet metal plate 48 having perpendicular, perforated aligned lugs 50 and 52 slidably mounting the toast carriage on a rod 54 extending vertically of the toaster casing and located between the partition 26 and a vertical partition 56. The partition 56 extends between the side walls 2 and 4 of the toaster casing and between the bottom plate 22 and the top wall of the casing. At its lower end the partition 56 may be secured to the bottom plate 22 as by forwardly and downwardly projecting lugs 58 passing through the bottom plate and twisted to hold the partition in place. At its top edge the partition 56 is formed with an inwardly turned flange 60 fastened to the partition 26 in any suitable manner.

The toast carriage 46 carries toast receiving shelves or trays 62 passing through a suitable opening or openings in the partition 26 and into the toasting chambers. At their outer ends the shelf members or bars 62 are bent downwardly and spot-welded or otherwise fastened to the plate 48. An operating arm of sheet metal has a portion 64 which passes through a slot in the plate 48 and has its bent-over end spot-welded or otherwise fastened to the inner surface of this plate. The arm portion 64 extends outwardly from the plate 48 at right angles thereto and passes through a slot (not shown) in the partition plate 56.

The operating arm includes a portion 68 extending downwardly from the arm portion 64 substantially parallel to the outer wall of the toaster casing and an outwardly bent portion extending out of the toaster casing through a slot 72 in one end wall of the casing. An operating knob or handle 74 is secured to the outer end of the operating arm.

A dash pot 76 of suitable construction in which a spring or the like resists an upward movement of a plunger 78 is mounted on the partition 26, or the partition plate 56, in position where its plunger 78 is engaged by a portion of the carriage 46, as for example, one of the shelves 62 as shown in Figure 3, as the carriage approaches its upper limit of movement to project the toast out of the openings 40 in the casing. The toast carriage is returned to this upper non-toasting position by a coil spring 80 having its upper end secured to the plate portion 60 of the partition 56 and its lower end secured to an inwardly bent lug 82 struck from the lower edge of the plate 48 of the toast carriage 46.

The bottom part of the toast chamber or chambers is partially closed by a detachable, generally pan-shaped tray 84 having a rear flange portion 86 off-set upwardly from the bottom of the pan and resting upon a downwardly off-set flange or lug 88 of the bottom plate 22. A cap screw 90 secures the opposite side of the pan 84 to the bottom plate 22 and is preferably so formed that the pan cannot be pulled up tightly against the bottom plate, but an opening is maintained between the pan and the bottom plate, which opening preferably extends around three sides at least of the pan so that a relatively large amount of air may pass between the pan and the bottom plate and upwardly through the toasting chambers. Thus the pan is maintained relatively cool and the heat within the toasting chambers is relatively rapidly dissipated between toasting operations.

This insures a relatively high degree of uniformity in the toasting of successive slices. The pan or tray 84 of course provides readily detachable crumb-receiving means underlying the toast chamber so that the crumbs from the toast will not collect, as formerly, upon parts of the toaster to which access cannot readily be had for cleaning purposes, but will collect upon the detachable pan which may be readily removed and cleaned.

As shown in my co-pending application, Serial No. 338,449, clock-controlled latching means may be provided for retaining the toast carriage in its lower, toasting position for periods predetermined by the setting of the knob 92. Starting of the clock and the turning on of the toaster are initiated by downward movement of a sheet metal carriage 94 operating through mechanisms disclosed in said co-pending application.

The carriage 94 is slidably mounted, as by the perforated ears or lugs 96, on a guide rod 98.

The guide rod 98 extends vertically in the space between one end wall of the toaster casing and the partition plate 56 as shown in Figure 2. This rod is mounted on the outwardly turned ears 100 of a generally U-shaped bracket 102 of sheet metal fastened to the partition plate 56. The carriage 94 has an outwardly-turned arm 104 formed integrally with a portion 106 which extends out of the toaster casing through a slot 108. The extending end 106 has secured thereto an operating knob or handle 110, which, when the carriage 94 and the carriage 46 are at their upper limits of movement, lies in a common plane with the operating knob 74 for the toast carriage 46 as shown in Figure 1. The guide rods 54 and 98 are parallel as also are the slots 72 and 108. Hence the knobs 74 and 110 may be operated simultaneously by the fingers of the same hand to place the carriage 46 in toasting position and the carriage 94 in a position setting the clock controlled mechanism and turning on the toaster.

A knob or handle 112 is secured to an end wall of the toaster casing as by the screw 114. The knob 112, in cooperation with the knob 74 and/or the knob 110, provides means for moving the toaster from place to place as desired.

Applicant's toaster may readily be assembled as follows: The sets of heating elements 30, 32 and 38 are secured to the partition plates 26 and 28 as by twisting the outwardly extending ends of the upper and lower hanger bars of these heating elements to hold the heating elements against lateral movement relative to these partition plates. The partition plates 26 and 28 may be secured to the bottom plate 22 as by twisting the depending lugs 34.

The toast carriage 46 is mounted on its guide rod 54 and the guide rod fastened in a suitable manner to its mounting lugs formed on the partition plate 56. The operating arm for the toast carriage is then positioned in its slot of the partition 56. The partition plate 56 is then secured to the bottom plate 22 and to the partition plate 26 as by twisting over lugs 58 formed on the plate 56 and which extend through openings in the bottom plate 22 and the partition plate 26. Before the plate 56 is positioned on the bottom plate, the bracket 102 for the carriage 94 is fastened to the outer surface of the plate 56 and the dash-pot 76 is secured to the inner surface of this plate.

The side forming plates 2 and 4 are first mounted on the mounting bars 8 as by the screws 6 and are then positioned to abut opposite edges of the partition plates 26, 28 and 56. The electrical connections between the heating elements are effected and the casing member 14 carrying the knob 112 is positioned so that its marginal flanges 12 overlie the marginal flanges 10 of the side pieces 2 and 4 and the member is fastened to the bottom plate as by the screws 18. The knobs 74 and 110 are secured to the projecting ends 70 and 106 of the carriages 46 and 94, and the knob 164 is secured to the outer end of the rod 166. The guard wires 44 may be secured to the central frame casing 14 either before or after its assembly with the other parts of the toaster casing. To complete the toaster, the crumb tray 84 is now positioned with its flange or lugs 86 overlying the flange or lugs 88 of the bottom plate 22 and fastened to the bottom plate in spaced relation by the screw 90.

As the toast carriage 46 approaches its upper non-toasting position, its speed of upward movement is checked by the dash-pot 76 as will be evident.

It will be seen from the foregoing description that applicant has provided an electric toaster which is economical to manufacture in which independent but simultaneously actuable members are provided to set the timing control and shift the article-receiving tray or trays to toast-receiving position; in which the toaster casing is formed entirely of sheet metal stampings which are readily assembled and interlocked at a minimum manufacturing expense; in which means is provided for creating a sufficient up-draft of air through the toasting chamber or chambers to insure uniform toasting of successive articles; and in which readily releasable crumb-receiving means is provided extending over substantially the entire bottom area of the toasting chamber or chambers.

Changes may be made in the form, construction and arrangement of the parts, without departing from the spirit of the invention or sacrificing any of its attendant advantages; and the right is hereby reserved to make all such changes as fall within the scope of the following claims:

The invention is hereby claimed as follows:

1. In an electric toaster, a casing, said casing comprising a bottom plate, heating elements and spaced inner partitions to which said elements are secured to form a toast chamber, means securing each of said inner partitions to said bottom plate, and an outer casing comprising pan-shaped side sections having center side wall portions residing against side margins of said inner partitions and constrained from shifting inwardly thereby, said sections having marginal flanges projecting outwardly in a plane parallel to the plane of said side wall portions and a central generally U-shaped casing section having an inwardly projecting marginal flange overlapping the marginal flange of the side sections but free from connection therewith to retain said side sections in assembled relation against lateral separation, said center section being secured to said bottom plate to secure the outer casing to the inner casing, said center section having an opening therein in alignment with the toast chamber for the insertion of the slices into the toast chamber.

2. In an electric toaster, an inner casing forming a toasting chamber, said inner casing having a bottom plate, and an outer casing comprising spaced, oppositely disposed pan-shaped side sections abutting the inner casing, said side sections extending toward each other along their top end margins and terminating in outwardly projecting marginal flanges, and a center section having opposed inwardly projecting marginal flanges overlying the marginal flanges of the side sections but free from attachment thereto to retain the sections in assembled relation, said inner casing including portions oppositely abutting the inner surface of said side sections to urge the said marginal flanges thereof into holding engagement with the complementary marginal flanges of the center section and to retain the parts in said position, and means for fastening the center section to the bottom plate to secure the outer casing to the inner casing, said center section having an opening therein above the toast chamber for the insertion of articles to be toasted.

3. In an electric toaster, an inner casing forming a toasting chamber, said inner casing having a bottom plate, and an outer casing comprising spaced, oppositely disposed pan-shaped side sections abutting the inner casing, said side sections extending toward each other along their top end margins and terminating in outwardly projecting marginal flanges, and a center section having opposed inwardly projecting marginal flanges overlying the marginal flanges of the side sections but free from attachment thereto to retain the sections in assembled relation, said inner casing including portions oppositely abutting the inner surface of said side sections to urge the said marginal flanges thereof into holding engagement with the complementary marginal flanges of the center section and to retain the parts in said position, supporting members for said side sections and spacing said bottom plate from a supporting surface, said center section having an opening therein above the toast chamber for the insertion of articles to be toasted, and means for fastening the center section to the bottom plate between said supporting members whereby cooling air may circulate between the supporting surface and the casing.

4. In an electric toaster, an inner casing forming a toasting chamber, said inner casing having a bottom plate, and an outer casing comprising spaced, oppositely disposed pan-shaped side sections abutting the inner casing, said side sections having extending toward each other along their top end and margins and terminating in outwardly projecting marginal flanges, and a center section having opposed inwardly projecting marginal flanges overlying the marginal flanges of the side sections but free from attachment thereto to retain the sections in assembled relation, said inner casing including upstanding partition wall members having their side margins abutting the inner surfaces of said side sections to hold the marginal flanges thereof in engagement with the overlying marginal flanges of the center section, the bottom plate of the inner casing having laterally extending marginal flanges abutting the side and center sections to reenforce the outer casing, the center section of the outer casing having at the lower ends of its opposed end walls flanges directed inwardly and abutting side marginal flanges of the bottom plate and fasteners securing said abutting flanges of the bottom plate and of the end walls of the center section.

5. In an electric toaster, comprising a casing having a bottom plate, said bottom plate having an opening therein substantially coextensive with the toasting chamber, the bottom plate having a downwardly offset portion at one edge of the opening, and a crumb-receiving tray having along a corresponding edge a portion off-set upwardly and resting upon the downwardly off-set portion of the bottom plate and fastening means at a spaced point on said tray operative to secure said tray to the base in spaced relation whereby to space the remaining edges of the tray from the bottom plate to permit a substantial updraft of air through the toasting chamber.

6. An electric toaster comprising an inner casing forming a toasting chamber, said inner casing comprising a bottom plate, and upstanding partitions mounted on the plate, an outer casing comprising opposed pan-shaped side sections abutting the side margins of said inner casing members and having peripheral wall sections extending toward the vertical central plane of the toaster, the said wall sections terminating short of said plane in outwardly extending marginal flanges, a center section extending about the top and ends of the casing and having opposed inwardly projecting marginal flanges along its side margins overlying the marginal flanges of said side sections to retain the said sections against separation, and means for fastening the center section to the bottom plate for retaining the parts in assembled relation, said flange being free from attachment and said fastening means serving to maintain the parts in the relative position defined.

7. An electric toaster as defined in claim 6 wherein said pan-shaped side sections are provided with supporting foot portions along their lower wall sections for directly supporting said side sections and wherein said bottom plane extends within said side sections and is supported thereby.

JAMES J. GOUGH.